No. 870,007. PATENTED NOV. 5, 1907.
A. J. AMUNDSON.
PLOW.
APPLICATION FILED JULY 1, 1907.

UNITED STATES PATENT OFFICE.

AMUND J. AMUNDSON, OF BALDWIN, WISCONSIN.

PLOW.

No. 870,007.

Specification of Letters Patent.

Patented Nov. 5, 1907.

Application filed July 1, 1907. Serial No. 381,583.

*To all whom it may concern:*

Be it known that I, AMUND J. AMUNDSON, a citizen of the United States, residing at Baldwin, in the county of St. Croix and State of Wisconsin, have invented certain new and useful Improvements in Plows, of which the following is a specification, reference being had to the accompanying drawings.

My invention relates to improvements in plows, and particularly to the improvement of plows provided with shields or fenders; and an object of my invention is to provide a plow of this class which will be suitable for plowing ground filled with the roots of weeds, "quack" grass, "switch" grass and the like. In order to rid the ground of such weeds, it is necessary to expose the roots of the weeds to the action of the harrow. Where the surface of the ground is left irregular and uneven by the plow, it is impossible to reach any great portion of the roots of the weeds with the harrow to lay them bare; but if the ground be left flat and level, its whole plowed surface will be subjected to the action of the harrow with the result that the weeds will be thoroughly eradicated. In order to leave the ground in this desirable level condition, the overlapping of one furrow by the next succeeding furrow must be avoided; and it is an object of my invention to provide a plow which will leave the ground level and which will to this end prevent the formation of "steps" by the overlapping of the furrows.

Figure 1:
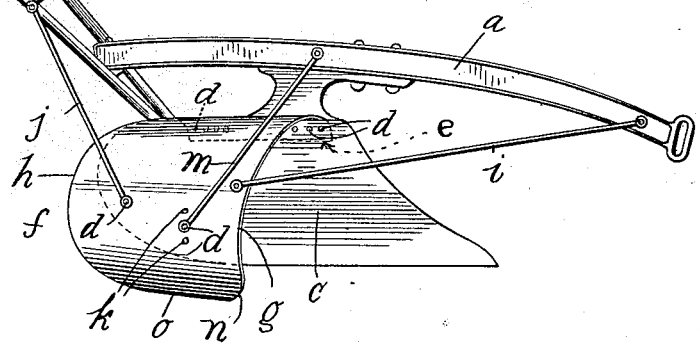
Figure 2:
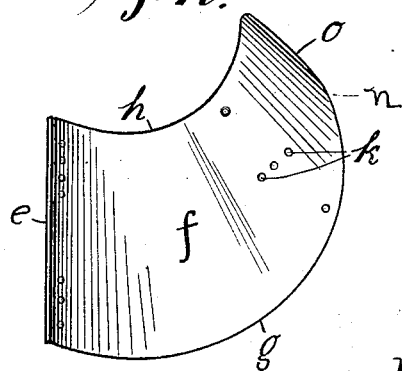
Figure 3:
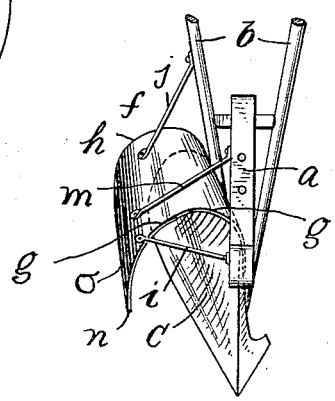

In the drawings illustrating the principle of my invention and the best mode now known to me of applying that principle, Figure 1 is an elevation of my new plow; Fig. 2 is an inside plan view of the shield attachment; and Fig. 3 is a fragmentary perspective view of my new plow.

To the plow-beam $a$ are secured the handle-bars $b$ and the moldboard $c$. These may be of any usual form of construction, the form shown being merely one of a large number of available types. To the moldboard $c$ is secured along the top of its inner face by the bolts $d$, the top $e$ of the four-sided shield $f$. The latter is made of spring-metal sufficiently yielding to prevent breakage and yet stiff enough to hold itself in place during the usual working of the plow; and it is of a thickness about equal to that of the moldboard. The lower portion of the shield $f$ curves inwardly so that it is convex outward and concave towards the moldboard $c$. One side $g$ is connected by a brace $i$ with the plow-beam, while the other side $h$ is connected similarly with one of the handle-bars $b$ by a brace $j$. Near its center the shield or fender $f$ is formed with the holes $k$ through one of which passes a bolt $d$ to secure one end of the brace $m$, the other end of which is similarly secured to the plow-beam $a$. The provision of three holes $k$ serves to allow for the adjustment of the spring shield $f$.

The corner $n$ of the shield $f$ between the side $g$ and the lower edge or bottom $o$ is rounded, in order to avoid the gathering of grass, weeds and the like and to make the passage of the shield easier. The bottom $o$ of the shield runs between the furrow being laid and the furrow next before laid to a sufficient depth to steer or direct the soil of the furrow being laid into the channel provided for it during the previous passage of the plow. Thus, the shield prevents the overlapping of one furrow by another and the resultant formation of so called "steps." As Figs. 1 and 3 clearly show, the bottom portion of the shield inclines from front to rear towards the longitudinal axis of the plow. The soil is thus confined to the exact place in which it is intended that it will lie and the surface of the ground is maintained level, in which the teeth of a harrow will reach all parts and loosen and lay bare the roots, which are later raked up and burned. The shield is adapted as well to a sulky plow as to a walking plow.

I claim:

1. In a plow, the combination with the plow-beam and moldboard of a spring metal shield the top edge of which is secured to said moldboard and the bottom edge of which is adapted to extend between the furrow being turned and the furrow next before laid and to a sufficient depth to direct the soil of the furrow being turned into place; said shield being concave towards said moldboard at its bottom portion and being thereby adapted to confine said soil to the place formed for its reception; and brace-rods connecting said shield with said plow-beam.

2. In a plow, the combination with the moldboard and plow-beam of a spring-metal shield secured thereto along the top edge of said shield; the bottom edge of said shield inclining towards the longitudinal axis of the plow from front to rear and being adapted to run along the outer side of the furrow being turned and the inner side of the furrow next before laid to a depth sufficient to direct the soil of the former furrow into place; the bottom portion of said shield being curved concave towards said moldboard and thereby adapted to confine the soil to the place formed for its reception and brace-rods connecting said shield with said plow-beam.

In witness whereof I have hereunto set my hand in the presence of the two undersigned witnesses at said Baldwin this 25th day of June, 1907.

AMUND J. AMUNDSON.

Witnesses:
B. J. WOLFOOT,
S. SWENUMSON.